United States Patent [19]

Auber et al.

[11] Patent Number: 5,760,766
[45] Date of Patent: Jun. 2, 1998

[54] POINTING DEVICE WITH RELOCATABLE CABLE

[75] Inventors: Roland Joseph Auber, Sindelfingen, Germany; Joseph Michael Mosley, Boca Raton, Fla.

[73] Assignee: International Business Machines Corp., Armonk, N.Y.

[21] Appl. No.: 38,424

[22] Filed: Mar. 29, 1993

[51] Int. Cl.⁶ .................................................. G09G 5/08
[52] U.S. Cl. ...................................................... 345/167
[58] Field of Search ............................ 340/709, 710; 439/452, 456, 457; 345/156, 161, 163, 167

[56] References Cited

U.S. PATENT DOCUMENTS

| | | | |
|---|---|---|---|
| 3,987,685 | 10/1976 | Opocensky | 74/471 R |
| 4,284,855 | 8/1981 | Adams et al. | 179/100 C |
| 4,718,085 | 1/1988 | Haskins | 439/452 |
| 4,748,441 | 5/1988 | Brzezinski | 340/709 |
| 4,862,165 | 9/1989 | Gart | 341/20 |
| 4,927,987 | 5/1990 | Kirchgessner | 345/156 |
| 4,952,919 | 8/1990 | Nippoldt | 340/710 |
| 5,059,958 | 10/1991 | Jacobs et al. | 340/706 |
| 5,078,019 | 1/1992 | Aoki | 340/710 |

FOREIGN PATENT DOCUMENTS

| | | | |
|---|---|---|---|
| 2536437 | 8/1975 | Germany | H04M 1/15 |

OTHER PUBLICATIONS

Appoint, "Thumblina PS/2 Portable", undated.
Appoint, "Thumblina, Guide to Operations", pp. 2–1.2–1, undated.

*Primary Examiner*—Curtis Kuntz
*Assistant Examiner*—Vivian Chang
*Attorney, Agent, or Firm*—Daniel E. McConnell

[57] ABSTRACT

A trackball pointing device has a housing of a size that can be readily held in the hand of a user. The housing includes a top wall upon which are mounted a trackball and buttons for manipulation by a user's thumb. A cable passes emerges from the bottom wall of the housing. The bottom wall includes a plurality of channels extending in different directions from where the cable passes through the housing wall. Each channel is recessed and has strain relief tabs therein so that the cable can be placed in one of the channels and releasably held in place by the tabs. A user can locate or place the cable in the one of the channels most suitable to the user.

5 Claims, 1 Drawing Sheet

POINTING DEVICE WITH RELOCATABLE CABLE

BACKGROUND OF THE INVENTION

1. Field of the Invention

This invention relates to pointing devices for use with data processing apparatus, and, more particularly, to a pointing device having improved cabling that can be readily relocated to suit user preference for operation in one of a variety of operational modes.

2. Prior Art

Pointing devices, such as mouse or trackball pointing devices, are commonly used with personal computers, as input devices for controlling the positions of display screen cursors and entering information into the computer. A mouse typically includes a ball that depends from the underside of the mouse housing and rests upon a surface. When the mouse is manipulated and moved relative to the surface, the ball rotates and actuates sensors to generate electrical signals that are transmitted through a cable to the computer. The signals are used to position the cursor proportional to the length and direction of the mouse movement. A mouse commonly has two buttons that are "clicked" to enter information. In some instances, a button is pressed, while the mouse is moved, so as to "drag" objects across the display screen.

A disadvantage of a mouse is that it requires an area or region in which it can be readily moved. In many instances, the available area, particularly on a desk, may be limited or unavailable. Thus, trackball devices were developed that can be used in a relatively small area. Such devices have been developed for simple desk top use, for attachment to the computer, and for integration into a computer. Recently, a small, trackball pointing device has been marketed under the name "Thumbelina" by Appoint Corporation. Such device can be used in a variety of modes including being attached to a computer, hand held, and on top of a keyboard. When hand held, the trackball can be manipulated or operated by a user's thumb. Buttons are located sufficiently close to the ball to be within the reach of and operated by the thumb. The device is attached to a computer by a cable which is attached to the housing in a single, fixed position.

U.S. Pat. No. 3,987,685—Opocensky, U.S. Pat. No. 4,748,441—Brzezinski, U.S. Pat. No. 4,862,165—Gart, U.S. Pat. No. 4,952,919—Nippoldt, and U.S. Pat. No. 5,059,958—Jacobs et al, respective disclose a mouse, a joystick, a mouse, a trackball, and a tilt sensitive, pointer devices each of which includes a cable having a single, fixed position at the place the cable extends away from the device.

German patent DT 25 36 437, and U.S. Pat. No. 4,718,085—Haskins and U.S. Pat. No. 4,284,855—Adams et al, each disclose a telephone having a base provided with grooves in which the telephone cord can be selectively positioned for wall mounting or desk mounting. In each case of mounting, the cord is recessed out of contact with the adjacent mounting surface. The telephone art is believed to be non-analogous to the art of pointing devices.

SUMMARY OF THE INVENTION

The disadvantage of a pointing device of the type described above, is that the cable is attached to the housing at a fixed position that may not be the most suitable for each of a variety of modes of operation. For example, a right handed person might prefer one location whereas a left handed person might prefer a different position. The invention improves upon prior art pointing devices, having a fixed cable position, by providing a cabling mechanism that allows the user to readily change the cable position to a more suitable location.

Thus, one of the objects of the invention is to provide an improved pointing device having a cabling mechanism that allows the cable, by which the pointing device is connected to a computer, to be positioned in one of a plurality of different positions where the cable extends away from the device.

Another object of the invention is to provide a hand held pointing device with a cabling mechanism in which the position of the cable can be readily set by the user, in one of a plurality of different locations.

A further object of the invention is to provide an ambidextrous hand held trackball pointing device having a cable, in which the position of the cable can be readily moved to a location providing less interference with user manipulation of the device.

Briefly, in accordance with the invention, a pointing device has a housing of a size that can be readily held in the hand of a user. The housing includes a top wall upon which cursor are mounted. A cable passes emerges from the bottom wall of the housing. The bottom wall includes a plurality of channels extending in different directions from where the cable passes through the housing wall. Each channel is recessed and has strain relief tabs therein so that the cable can be placed in one of the channels and releasably held in place by the tabs. A user can locate or place the cable in the one of the channels most suitable to the user.

DRAWINGS

Other objects and advantages of the invention will be apparent from the following description taken in connection with the accompanying drawing wherein.

DETAILED DESCRIPTION

Figure 1:
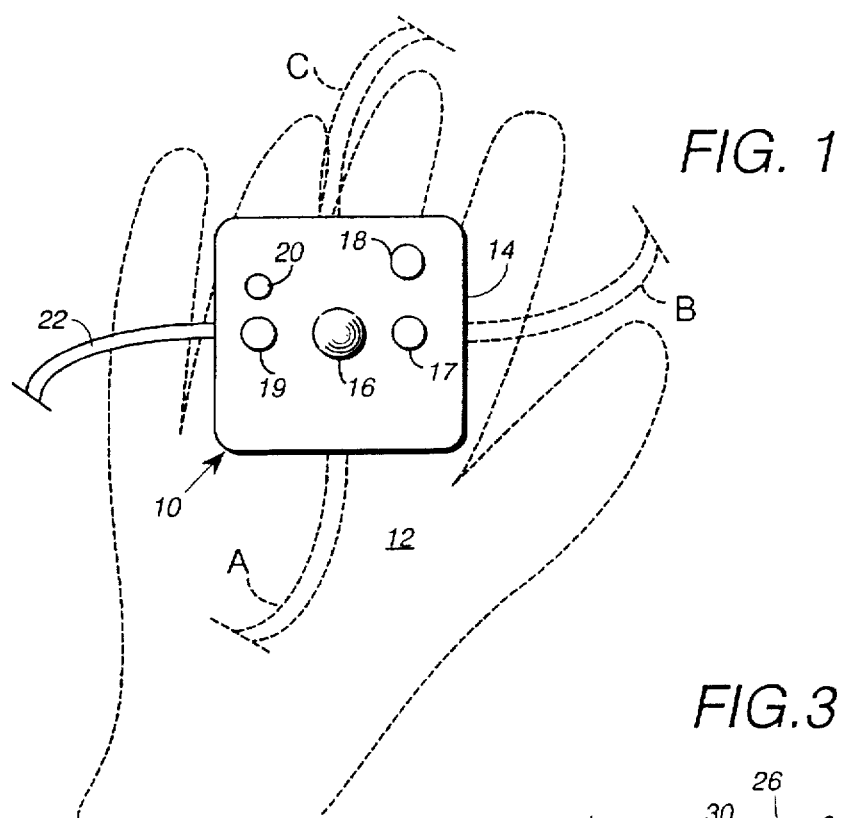
FIG. 1 is a top plan view of a pointing device embodying the invention.

Referring now to the drawing, and first to FIG. 1, a trackball pointing device 10 includes a box-like housing 14 of a size for being held in the hand 12 of a normal user. A rotatable trackball 16 in mounted in the center of the top wall 15 of housing 14 and projects upwardly. Cursor controls 16–20 are mounted on top of housing 14, and a cable 22 is attached to housing 14 for transmitting electrical signals between device 10 and a standard computer (not shown). The computer may be a lap top, note book, or a personal computer, and the like. Housing 14 encloses standard trackball electrical components (not shown) which receive power through cable 22.

The cursor controls provide signals to the computer similar to the signals of a conventional two button mouse. The controls include a trackball 16 mounted in the center and three buttons 17–19 mounted nearby. Button 17 simulates the "left" button of a mouse and is commonly used to make "clicks" and selections. Button 18 simulates the "right" button of a mouse and is optionally usable with appropriate software. Button 19 is a drag button located adjacent to a light 20. When button 19 is pressed, light 20 goes on and remains lit signifying a drag operation in progress. The light is turn off and the drag operation ceases when any one of the buttons is pressed. The controls are located sufficiently close to one another so that when device 10 is used in the hand-held mode, the controls are within reach of a user's thumb for manipulation thereby.

Figure 2:
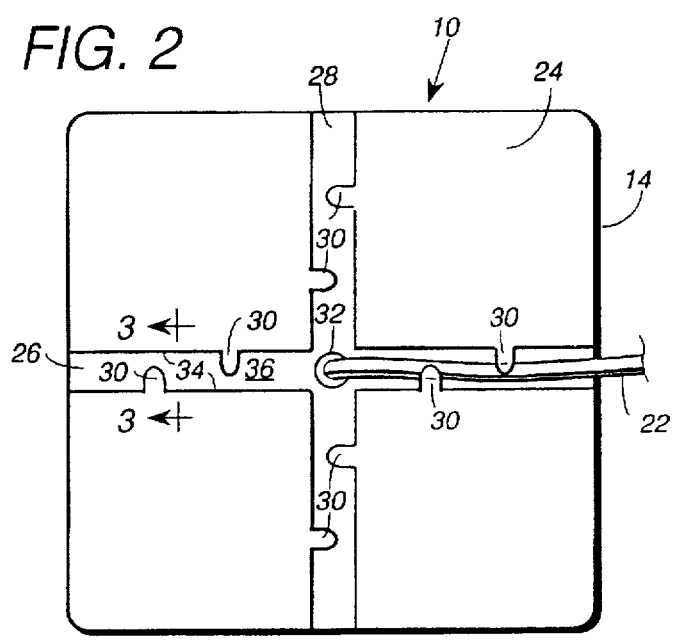
FIG. 2 is a bottom plan view of the device shown in FIG. 1.

With reference to FIG. 2, housing 14 includes a bottom wall 24 having a flat outer or bottom surface that lies in a plane parallel to the flat, upper surface of top wall 15. Bottom wall 24 is criss-crossed by two channels 26 and 28 that are orthogonal (at right angles) relative to each other and meet or intersect at the center of the bottom wall. The channels extend laterally outwardly from the bottom wall center and open laterally beneath the centers of the side walls of housing 14.

Figure 3:
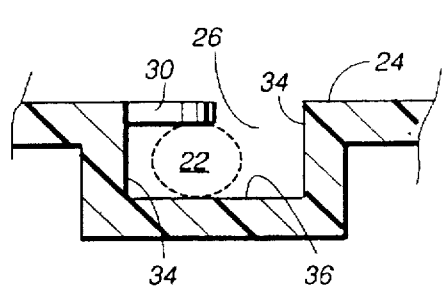
FIG. 3 is an enlarged elevation view, partly in section, of the housing, looking along reference lines 3—3 in FIG. 2.

A grommet 32 is located in the intersection of channels 26 and 28 and has a hole through which cable 22 emerges from the inside of the housing. As shown, relative to channel 26 in FIG. 3, each channel has two parallel side walls 34 and a bottom wall 36, thereby producing a channel of U-shaped cross section that is recessed in the bottom wall of the housing. A plurality of strain relief tabs 30 extend horizontally into the channels at spaced points. The outer surfaces of tabs 30 lie in the plane of the outer surface of bottom wall 24. Each tab is in the shape of a cantilever having one end supported by the bottom wall and a free end that extends partially across the adjacent channel.

Cable 22 is flexible so that it can be easily routed through one of the four channels extending away from the bottom wall center where the cable emerges from the housing. The cable has a plurality of flexible wires (not shown) covered by an outer sheath of protective, electrical insulation material. As shown by the dotted lines in FIG. 3, cable 22 has a generally circular cross section of a diameter slightly greater than the depth of the channel measured between adjacent surfaces of tab 30 and bottom wall 36. The width of the channel between side walls 34 is greater that the diameter of cable 22, and the distance from the tip of tab 30 to the opposing side wall 34 is about equal to the diameter of cable 22. The outer cover of cable 22 is deformable so the cable can be pressed by a user between each tab 30 in a channel and the opposing side wall, into a position where the cable is wedged between the bottom of tab 30 and bottom wall 36 of the channel. When so wedged, cable 22 is frictionally held in place, and lies with the recess of the channel. The cable can be readily removed or pulled from such position for relocation to another channel.

As previously indicated, pointing device is designed to be supported or held in the user's hand in a position allowing the user's thumb to manipulate trackball 16 and buttons. With the invention, the user has a choice of where to position cable 22. A right handed user might prefer positioning cable 22 to emerge from the left side of the device as shown in full lines in FIG. 1. A left handed person might prefer the cable to emerge along the right side in dotted line position B. The cable could also be located in either the upper side position C or lower side position A. Thus, while cable 22 initially emerges from the housing into the channels at a fixed location, the cable then passes through the rest of the channel and emerges from housing 14 at one of four different locations generally located at the upper, lower and side edges of the housing. The cable then extends away from the housing in one of four different directions, the one direction being in alignment with the direction of the channel in which the cable is located. Device 10 may also be mounted directly on a computer by an adapter (not shown), on a keyboard, or on a desk top, and the cable positioned at the best location for each mode.

It should be apparent to those skilled in the art that many changes can be made in the details and arrangements of steps and parts without departing from the scope of the invention as defined in the appended claims.

What is claimed is:

1. A hand-held, finger-operated trackball pointing device comprising:

a housing for housing electrical components of said device, said housing being box shaped and having a top wall, a bottom wall, and side walls extending between said top wall and said bottom wall, said housing being of a size adapted to be held in a user's hand and having cursor controls mounted thereon which are adapted to be manipulated by a user while said housing is being held in the user's hand;

said cursor controls comprising a trackball mounted in said housing and having a portion protecting upwardly from said top wall, for manipulation by a user's finger;

said cursor controls further comprising selectively actuated button means mounted said top wall adjacent to said trackball, for actuation by a user's finger;

a cable for attaching said pointing device to a computer, said cable passing downwardly through said bottom wall of said housing;

said bottom wall having two recessed channels extending orthogonally relative to each other between said sides of said housing, said channels intersecting where said cable passes through said bottom wall, each of said channels having a U-shaped cross section opening downwardly from said bottom wall, each channel having a depth at least as great as the thickness of said cable so that said cable can be positioned vertically within said channel and lie wholly within said channel without projecting downwardly beyond said bottom wall;

said cable being flexible allowing a user to selectively position said cable in any one of said channels so as to direct said cable away from said housing in a direction selected by the user and minimize interference between the cable and the user's hand during operation of said pointing device; and tab means located in said channels for frictionally holding said cable in place in the one of said channels where said cable is positioned by the user.

2. A trackball pointing device in accordance with claim 1 wherein said tab means comprises a plurality of tabs; each tab extending partially across a channel from one side wall towards another side wall but terminating short of said another side wall to provide space for inserting said cable, and each tab having a surface for wedging said cable in such channel between said surface and an end wall of such channel.

3. A trackball pointing device in accordance with claim 2 wherein said housing is rectangularly shaped in plan view, said cable passes through the center of said bottom wall, and said channels open laterally through the bottom centers of said side walls.

4. A trackball pointing device operable in a hand-held mode and comprising:

a housing for housing electrical components of said device, said housing being box shaped and having a top wall, a bottom wall, and side walls extending between said top wall and said bottom wall, said housing being of a size adapted to be held in a user's hand;

said bottom wall having four recessed channels that intersect at the center of said bottom wall and extend laterally therefrom at right angles to each other, said channels each having an inverted U-shaped cross section of a depth and width allowing a cable to be routed through a channel without extending outside of such channel, said cross section being bounded by two side walls and a top wall extending between said side walls;

cursor controls mounted on said top wall and including a trackball and button means that are selectively hand manipulable by a user for generating cursor control signals;

a flexible cable for attaching said pointing device to a computer and transmitting said signals, said cable emerging from said housing into said channels where said channels intersect, said cable being routed through one of said channels and extending away from said housing along the direction of the channel in which the cable is positioned; and tab means located in said channels for releasably and frictionally holding said cable in place in the one of said channels and allowing said cable to be repositioned by a user in any one of the other channels to extend away from said housing in a direction selected by the user and minimize interference between the cable and the user's hand during operation of said pointing device.

5. A trackball pointing device in accordance with claim 4 wherein said tab means comprises a plurality of tabs, each tab being a cantilever having a length less than the width of a channel and extending partially across a channel from one side wall towards the other side wall, so that said cable can be positioned in said channel and wedged by said tab between said tab and said top wall of said channel.

* * * * *